(12) United States Patent
Jiang et al.

(10) Patent No.: US 10,967,439 B2
(45) Date of Patent: Apr. 6, 2021

(54) ELECTRICAL TOOLS

(71) Applicants: Fuzhou BOE Optoelectronics Technology Co., Ltd., Fuzhou (CN); BOE Technology Group Co., Ltd., Beijing (CN)

(72) Inventors: Zisong Jiang, Beijing (CN); Jinyin Zuo, Beijing (CN); Xiaowei Xu, Beijing (CN); Huizhen Du, Beijing (CN); Duo Zhang, Beijing (CN)

(73) Assignees: FUZHOU BOE OPTOELECTRONICS TECHNOLOGY CO., LTD., Fuzhou (CN); BOE TECHNOLOGY GROUP CO., LTD., Beijing (CN)

( * ) Notice: Subject to any disclaimer, the term of this patent is extended or adjusted under 35 U.S.C. 154(b) by 33 days.

(21) Appl. No.: 16/328,469

(22) PCT Filed: Jul. 12, 2018

(86) PCT No.: PCT/CN2018/095352
§ 371 (c)(1),
(2) Date: Feb. 26, 2019

(87) PCT Pub. No.: WO2019/056835
PCT Pub. Date: Mar. 28, 2019

(65) Prior Publication Data
US 2020/0156160 A1 May 21, 2020

(30) Foreign Application Priority Data
Sep. 20, 2017 (CN) .......................... 201710851337.7

(51) Int. Cl.
*B23Q 1/00* (2006.01)
*B23B 45/02* (2006.01)
*B23C 1/12* (2006.01)

(52) U.S. Cl.
CPC ............ *B23B 45/02* (2013.01); *B23Q 1/0027* (2013.01); *B23C 1/12* (2013.01)

(58) Field of Classification Search
CPC ...... B23Q 1/0027; B23Q 1/5412; B23Q 5/20; B23C 1/12; Y10T 409/307672;
(Continued)

(56) References Cited

U.S. PATENT DOCUMENTS 5,878,476 A * 3/1999 Noelle .................... B23Q 5/043
29/469
5,961,156 A * 10/1999 Furuhashi ............ B23Q 1/0009
285/154.1
(Continued)

FOREIGN PATENT DOCUMENTS

CN 202412133 U 9/2012
CN 203305190 U 11/2013
(Continued)

OTHER PUBLICATIONS

International Search Report and Written Opinion (including English translation of Search Report and Box V of Written Opinion) for International Application No. PCT/CN2018/095352, dated Aug. 24, 2018, 14 pages.
(Continued)

*Primary Examiner* — Nicole N Ramos
(74) *Attorney, Agent, or Firm* — Westman, Champlin & Koehler, P.A.

(57) ABSTRACT

An electrical tool including: a cutter bit assembly, a driving mechanism for providing a power to the cutter bit assembly, and a flexible transmission mechanism, which is connected at one end thereof to the driving mechanism and connected at the other end thereof to the cutter bit assembly; the flexible transmission mechanism is twistable and bendable,
(Continued)

and is configured to transmit the power provided by the driving mechanism to the cutter bit assembly.

12 Claims, 2 Drawing Sheets

(58) Field of Classification Search
CPC . Y10T 409/308232; Y10T 409/309296; Y10T 409/309352
See application file for complete search history.

(56) References Cited

U.S. PATENT DOCUMENTS

| | | | | |
|---|---|---|---|---|
| 7,891,920 B2* | 2/2011 | Yoneyama | ............ | B23Q 1/0009 409/201 |
| 2001/0049325 A1* | 12/2001 | Katoh | ............ | B23Q 5/10 483/30 |
| 2003/0072630 A1* | 4/2003 | Kato | ............ | B23Q 1/0009 409/230 |
| 2005/0141975 A1* | 6/2005 | Hardesty | ............ | B23Q 5/04 409/201 |
| 2016/0339568 A1 | 11/2016 | Hu | | |
| 2017/0210015 A1 | 7/2017 | Jogasaki | | |
| 2018/0010297 A1* | 1/2018 | Garbarsky | ............ | B23Q 1/52 |

FOREIGN PATENT DOCUMENTS

| | | | | |
|---|---|---|---|---|
| CN | 103752666 A | | 4/2014 | |
| CN | 205218968 U | | 5/2016 | |
| CN | 205465927 U | | 8/2016 | |
| CN | 106041807 A | | 10/2016 | |
| CN | 205842094 U | | 12/2016 | |
| CN | 206169955 U | | 5/2017 | |
| CN | 107538431 A | | 1/2018 | |
| DE | 202011108153 U1 | * | 2/2012 | ............ B23Q 1/54 |
| DE | 102015200665 A1 | * | 7/2016 | ............ D07B 7/14 |
| EP | 2624390 A2 | * | 8/2013 | ............ H02G 3/0468 |
| GB | 2466770 A | | 7/2010 | |
| JP | 60167728 A | * | 8/1985 | ............ B23Q 1/0009 |
| JP | S60-217080 A | | 10/1985 | |
| JP | 2008161953 A | * | 7/2008 | |

OTHER PUBLICATIONS

Wen Bin (edited by), "A Handbook on Coupling Design Selection", China Machine Press, cited in first Chinese Office Action, 12 pages.
First Office Action, including Search Report, for Chinese Patent Application No. 201710851337.7, dated Sep. 13, 2018, 22 pages.

* cited by examiner

ELECTRICAL TOOLS

CROSS-REFERENCE TO RELATED APPLICATION

This application is a Section 371 National Stage application of International Application No. PCT/CN2018/095352, filed 12 Jul. 2018, and claims priority to Chinese Patent Application No. 201710851337.7 filed on Sep. 20, 2017 in the State Intellectual Property Office of China, the disclosures of which are incorporated herein by reference.

TECHNICAL FIELD

The present disclosure relates to a field of assembly tools, and in particular to an electrical tool.

BACKGROUND

In the electrical tool of the related art, a cutter bit or a cutter head is connected to a body of the electrical tool. Since the body of the electrical tool is bulky, a relative large space is required when the electrical tool is used. However, the electrical tool of the related art cannot be used inside small spaces such as an equipment and a pipe, which limits utility range of the electrical tools.

SUMMARY

According to an aspect of the present disclosure, there is provided an electrical tool comprising: a cutter bit assembly, a driving mechanism for providing a power to the cutter bit assembly, and a flexible transmission mechanism, which is connected at one end thereof to the driving mechanism and connected at the other end thereof to the cutter bit assembly; the flexible transmission mechanism is twistable and bendable, and is configured to transmit the power provided by the driving mechanism to the cutter bit assembly.

In an embodiment of the present disclosure, the flexible transmission mechanism comprises a flexible transmission piece having a plurality of rigid support portions and a flexible connecting piece, and each two adjacent rigid support portions are connected by the flexible connecting piece to achieve an adjustment of torsion and bending between the two adjacent rigid support portions.

In an embodiment of the present disclosure, the flexible connecting piece comprises a flexible cord, and the plurality of rigid support portions comprises a plurality of rigid balls with a through hole on each of the rigid balls, wherein the rigid balls are mounted on the flexible cord sequentially and successively and are bonded with the flexible cord.

In an embodiment of the present disclosure, the flexible transmission mechanism further comprises a bushing sleeved outside the flexible transmission piece, wherein the rigid support portions may support the bushing.

In an embodiment of the present disclosure, the bushing is provided at one end thereof with a first joint to be connected with the driving mechanism, and is provided at the other end thereof with a second joint to be connected with the cutter bit assembly.

In an embodiment of the present disclosure, the bushing comprises a first bushing and a second bushing sleeved outside the first bushing, and a wire for electrically connecting the driving mechanism with the cutter bit assembly is provided between the first bushing and a second bushing.

In an embodiment of the present disclosure, the wire and the first joint are electrically connected through a plug-in connection between a first wire pin and a first wire slot, while the wire and the second joint are electrically connected through a plug-in connection between a second wire pin and a second wire slot, the first joint being electrically connected to the driving mechanism, and the second joint being electrically connected to the cutter bit assembly.

In an embodiment of the present disclosure, the cutter bit assembly comprises a rotatable cutter and a speed adjustment switch for adjusting a rotational speed of the cutter; the speed adjustment switch is in a signal connection with the driving mechanism.

In an embodiment of the present disclosure, the driving mechanism comprises a driving motor for driving the cutter bit assembly to move; the driving motor is connected to the flexible transmission piece and the flexible transmission piece transmits the driving motion provided by the driving motor to the cutter bit assembly.

In an embodiment of the present disclosure, the driving mechanism further comprises torque detecting device for detecting torque of the driving motor, the torque detecting device being in a signal connection with the driving motor.

In an embodiment of the present disclosure, the driving mechanism comprises a control circuit being in a signal connection with the driving motor and the speed adjustment switch, respectively.

In an embodiment of the present disclosure, a power module is provided in the driving mechanism, and the power module comprises a storage battery and a power input interface to be connected with an external power source, the power input interface being electrically connected to the storage battery and the driving motor respectively.

In an embodiment of the present disclosure, the cutter bit assembly further comprises an adapter for mounting the cutter, on which is provided a first protrusion and a cutter bit slot, and a first groove with a shape matching the first protrusion is provided on the flexibility transmission piece, wherein the adapter and the flexible transmission piece are in a matching connection through the first groove and the first protrusion, and the adapter and the cutter are in a matching connection through the cutter bit slot and an inserting end of the cutter.

In an embodiment of the present disclosure, the cutter bit assembly further comprises a rotatable cutter bit and a rotary switch for starting and interrupting a rotation of the cutter bit.

DETAILED DESCRIPTION OF EMBODIMENTS

The technical solutions in the embodiments of the present disclosure are clearly and completely described in the following with reference to the accompanying drawings in the embodiments of the present disclosure. It is obvious that the described embodiments are only some of the embodiments of the present disclosure, instead of all of the embodiments. All other embodiments obtained by those skilled in the art based on the embodiments of the present disclosure without an inventive effort falls within the protective scope of the present disclosure.

Figure 1:
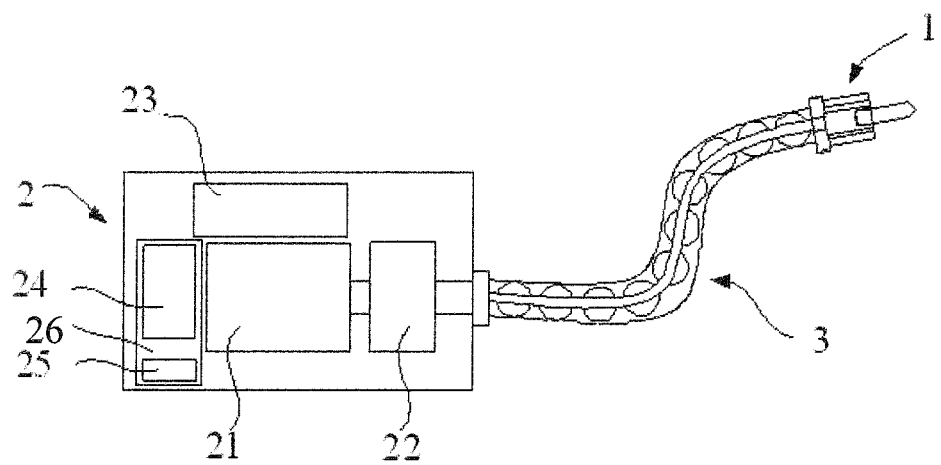
FIG. 1 is a schematic structural view of an electrical tool according to an embodiment of the present disclosure.
Figure 2:
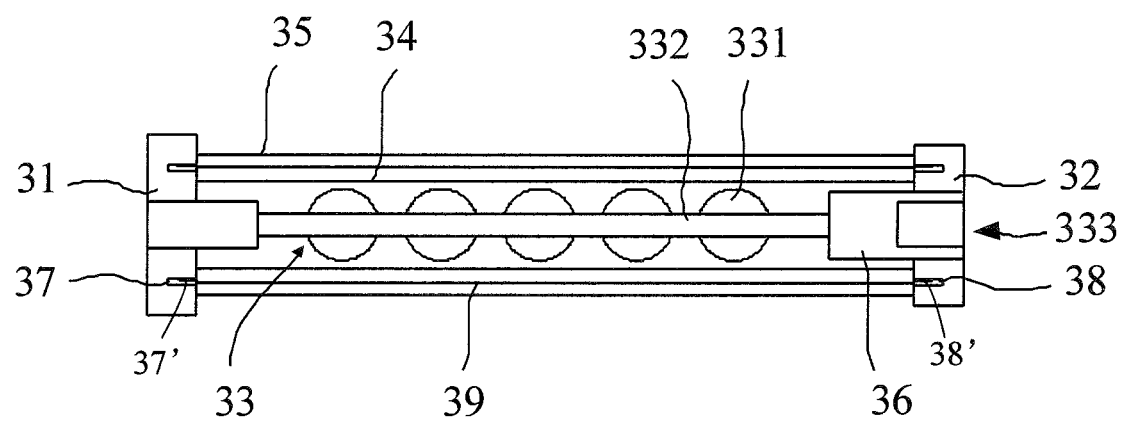
FIG. 2 is a schematic structural view of a flexible transmission mechanism according to an embodiment of the present disclosure.

Referring to FIG. 1 to FIG. 2, an electrical tool according to an embodiment of the present disclosure includes:

a cutter bit assembly 1, a driving mechanism 2 for providing a power to the cutter bit assembly 1, and a flexible transmission mechanism 3. The flexible transmission mechanism 3 is connected at one end thereof to the driving mechanism 2 and is connected at the other end thereof to the cutter bit assembly 1; the flexible transmission mechanism 3 is configured to have a certain rigidity and is capable of being twisted and bent, such that the flexible transmission mechanism 3 may transmit the power provided by the driving mechanism 2 to the cutter bit assembly 1.

In the above electric tool, the flexible transmission mechanism 3 is connected at one end thereof to the driving mechanism 2, and is connected at the other end thereof to the cutter bit assembly 1. When the driving mechanism 2 is in operation, the flexible transmission mechanism 3 is rotated, and the flexible transmission mechanism 3 drives the cutter bit assembly 1 to rotate so as to achieve an operation/manipulation of a work piece to be operated. The flexible transmission mechanism 3 may be bent according to the requirement of the working environment, further the volume of the flexible transmission mechanism 3 is relatively small, so that the flexible transmission mechanism 3 may extend a working end of the electric tool while being well adapted to work inside small spaces such as an equipment and a pipe, thereby expanding the utility range of the electrical tool;

Therefore, in the above electrical tool, the flexible transmission mechanism 3 is disposed between the cutter bit assembly 1 and the driving mechanism 2, with an advantage that the flexible mechanism is relatively small in size and arbitrarily bendable, the working end of the electrical tool is extended, and the electrical tool can be better used inside small spaces such as an equipment and a pipe, thereby expanding the utility range of the electrical tool.

Specifically, the flexible transmission mechanism 3 includes a flexible transmission piece 33 including a plurality of rigid support portions 331 and a flexible connecting piece 332. Each two adjacent rigid support portions 331 are connected with the flexible connecting piece 332 to achieve an adjustment of torsion and bending between the two adjacent rigid support portions 331.

The flexible transmission piece 33 includes the plurality of rigid support portions 331. When the flexible transmission piece 33 is rotated, an energy loss in the output torque of the driving mechanism 2 may be reduced, and the use efficiency of the electrical tool will be improved.

Specifically, the flexible connecting piece 332 further includes a flexible cord, and the rigid support portion 331 includes rigid balls. A through hole is provided on each of the rigid balls. The rigid balls are mounted on the flexible cord via the through hole sequentially and successively and are bonded with the flexible cord.

Specifically, the flexible transmission mechanism 3 further includes a bushing that is sleeved outside the flexible transmission piece 33 and the rigid support portions 331 may support the bushing.

The bushing is externally disposed around the flexible transmission piece 33 to protect the flexible transmission piece 33, thereby effectively avoiding abrasion and corrosion of the transmission mechanism, and facilitating use of the electrical tool by the user.

Specifically, the bushing is provided at one end thereof with a first joint 31 to be connected with the driving mechanism 2, and is provided at the other end thereof with a second joint 32 to be connected with the cutter bit assembly 1.

Specifically, the bushing includes a first bushing 34 and a second bushing 35 sleeved outside the first bushing 34. A wire 39 for electrically connecting the driving mechanism 2 with the cutter bit assembly 1 is provided between the first bushing 34 and a second bushing 35.

The first bushing 34 and the second bushing 35 are disposed outside of the flexible transmission piece 33 sequentially to effectively protect the flexible transmission piece 33 from abrasion and corrosion, and at the same time facilitating the operator to hold and use the flexible transmission mechanism 3. On the other hand, the wire 39 for electrically connecting the driving mechanism 2 with the cutter bit assembly 1 is provided between the first bushing 34 and a second bushing 35, such that the flexible transmission piece 33 and the wire 39 are separated from each other to prevent damage to the wire 39 due to interfere with the wire 39 during rotation of the flexible transmission piece 33. In addition, the wire 39 is isolated from the outside to prevent the wire 39 from being damaged by external interference and corrosion.

Specifically, the wire 39 and the first joint 31 are electrically connected with each other through a plug-in connection between a first wire pin 37' and a first wire slot 37, while the wire 39 and the second joint 32 are electrically connected with each other through a plug-in connection between a second wire pin 38' and a second wire slot 38. The first joint 31 is electrically connected to the driving mechanism 2, while the second joint 32 is electrically connected to the cutter bit assembly 1.

In the above flexible transmission mechanism 3, the wire 39 is electrically connected to the first joint 31 through the plug-in connection between the first wire pin 37' and the first wire slot 37, while the wire 39 is electrically connected to the second joint 32 through the plug-in connection between the second wire pin 38' and the second wire slot 38. Further, the first joint 31 is electrically connected to the driving mechanism 2, and the second joint 32 is electrically connected to the cutter bit assembly 1, thereby achieving an electrical connection between the cutter bit assembly 1 and the driving mechanism 2. Further, since the first wire pin 37', the first slot 37 as well as the second wire pin 38', the second slot 38 are provided, the electrical connection between the cutter bit assembly 1 and the driving mechanism 2 is divided into three parts, thereby facilitating later maintenance and overhaul.

As an embodiment of the above-mentioned cutter bit assembly 1, the cutter bit assembly 1 is provided with a speed adjustment switch 122 for adjusting a rotational speed of a cutter bit 11, and the speed adjustment switch 122 is in a signal connection/communication with the driving mechanism 2.

When one uses the electrical tool, the rotation speed of the cutter bit 11 is adjusted according to a use requirement. When one uses the speed adjustment switch 122 to adjust the rotation speed of the cutter bit 11, a signal is transmitted to the driving mechanism 2 through the wire 39, and the driving mechanism 2 increases or decreases the output rotation speed according to the received signal to achieve the purpose of adjusting the rotation speed of the cutter bit 11. Further, the cutter bit assembly 1 further comprises a rotary switch 123 for starting and interrupting a rotation of the cutter bit, so as to facilitate an easy and flexible operation of the user.

Referring to FIG. 1, as an embodiment of the above driving mechanism 2, the driving mechanism 2 includes a driving motor 21 and a torque detecting device 22 for detecting the torque of the driving motor 21. The torque detecting device 22 is in a signal connection with the driving motor 21, while the driving motor 21 is connected to the flexible transmission piece 33.

In the above driving mechanism 2, the torque detecting device 22 detect the torque of the driving motor 21, and the torque detecting device 22 may feedback the detected actual torque of the driving motor 21. When the actual torque value of the driving motor 21 as detected is different from a preset value, a maintenance staff will be informed to adjust the driving motor 21.

When the driving motor 21 is in operation, the flexible transmission piece 33 is rotated with an output shaft of the motor, so as to rotate the cutter bit 11, thus to operate the work piece to be operated.

Specifically, the driving mechanism 2 includes a control circuit 23 that is in signal connection with the driving motor 21 and the speed adjustment switch 122, respectively.

When using the above driving mechanism 2, the user adjusts the rotational speed of the cutter bit 11, and the speed adjustment switch 122 sends out a signal, and the signal is transmitted to the control circuit 23 via the wire 39, and the control circuit 23 processes the received signal and communications a signal for adjusting the rotational speed of the driving motor 21 to the driving motor 21, thereby achieving an adjustment to the rotational speed of the cutter bit 11.

Specifically, a power module 26 is provided in the driving mechanism 2, and the power module 26 comprises a storage battery 24 and a power input interface 25 to be connected with an external power source. The power input interface 25 is electrically connected to the storage battery 24 and the driving motor 21 respectively.

In the above driving mechanism 2, when the electrical tool is used in the condition that it is far away from the external power source, the driving motor 21 may be supplied with electric energy by the storage battery 24 to make the electrical tool work normally. When the electrical tool is used in the condition that it is close to the external power source, the driving motor 21 may be powered by the external power source or the storage battery 24. When the storage battery 24 has insufficient power therein, the power of the external power source may be transmitted to the storage battery 24 through the power input interface 25 to charge the storage battery 24.

As an embodiment of the above-mentioned cutter bit assembly 1, the cutter bit assembly 1 includes an adapter 12 for mounting the cutter bit 11. The adapter 12 and the flexible transmission piece 33 are in a matching connection through a first groove 333 and a first protrusion 334, while the adapter 12 and the cutter bit 11 are in a matching connection through a cutter bit slot 121 and an inserting end 111 of the cutter bit.

In the above cutter bit assembly 1, the adapter 12 provided in the cutter bit assembly 1 and the flexible transmission piece 33 are in a matching connection through the first groove 333 and the first protrusion 334, while the adapter 12 and the cutter bit 11 are in a matching connection through the cutter bit slot 121 and an inserting end 111 of the cutter bit. When the flexible transmission piece 33 is rotated, the adapter 12 is rotated with the flexible transmission piece 33, so as to rotate the cutter bit 11 mounted on the adapter 12.

Figure 3:
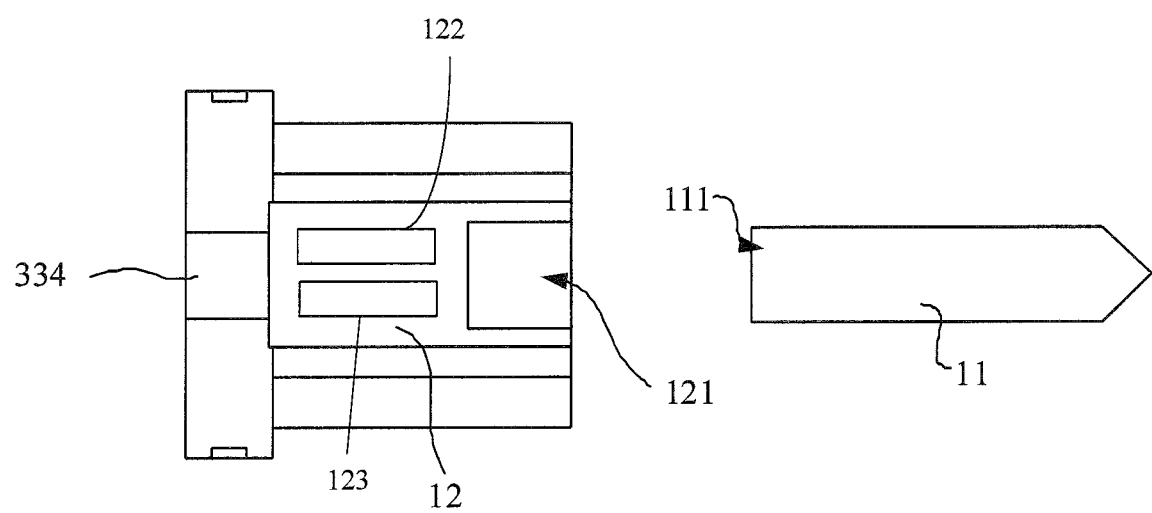
FIG. 3 is a schematic structural view of a cutter bit assembly according to an embodiment of the present disclosure.

Specifically, as shown in FIGS. 2 and 3, a first protrusion 334 is formed at an end of the adapter 12 facing toward the flexible transmission mechanism 3, and a connector 36 is provided at an end of the flexible transmission piece 33 facing toward the cutter bit assembly 1. A first groove 333 for matching the first protrusion 334 is provided on a side of the connector 36 facing toward the cutter bit assembly 1.

Referring to FIG. 3, specifically, a cutter bit slot 121 for mounting the cutter bit 11 is provided at an end of the adapter 12 facing away from the flexible transmission mechanism 3.

One end of the adapter 12 is provided with the cutter bit slot 121. The user may select different cutter bits 11 and install them in the cutter bit slot 121 according to the type of the cutter bit 11 to be used, and then the cutter bit 11 may be driven to rotate by the adapter 12 to perform an operation.

Specifically, as shown in FIG. 3, when the cutter bit assembly 1 is assembled, the cutter bit 11 is inserted into the cutter bit slot 121, that is, the inserting end 111 of the cutter bit is inserted into the cutter bit slot 121. At this time, the shape of the inserting end 111 of the cutter bit is in a shape which is similar to that of the cutter bit slot 121. When a cross section of the cutter bit slot 121 is triangular, the cross section of the inserting end 111 of the cutter bit is also triangular. When the cross section of the cutter bit slot 121 is hexagonal, the cross section of the inserting end 111 of the cutter bit is also hexagonal.

Specifically, the electrical tool in each of the above embodiments may be an electric screwdriver, an electric grinding wheel, or an electric polishing machine.

It will be apparent to those skilled in the art that various modifications and variations may be made to the embodiments of the present disclosure without departing from the spirit and scope of the disclosure. Thus, it is intended that the present invention cover these modifications and variations if such modifications and variations of the present disclosure are within the protective scope of the appended claims and their equivalents.

What is claimed is:

1. An electrical tool comprising:
    a cutter bit assembly,
    a driving mechanism for providing a power to the cutter bit assembly, and
    a flexible transmission mechanism, which is connected at one end thereof to the driving mechanism and connected at the other end thereof to the cutter bit assembly; the flexible transmission mechanism is twistable and bendable, and is configured to transmit the power provided by the driving mechanism to the cutter bit assembly,
    wherein the flexible transmission mechanism comprises a flexible transmission piece having a plurality of rigid support portions and a flexible connecting piece, and each two adjacent rigid support portions are connected by the flexible connecting piece to achieve an adjustment of torsion and bending between the two adjacent rigid support portions, and
    wherein the flexible connecting piece is a flexible cord, and the plurality of rigid support portions are a plurality of rigid balls with a through hole on each of the rigid balls, wherein the rigid balls are mounted on the flexible cord sequentially and successively and are bonded with the flexible cord.

2. The electrical tool according to claim 1, wherein the flexible transmission mechanism further comprises a bushing sleeved outside the flexible transmission piece, wherein the rigid support portions support the bushing.

3. The electrical tool according to claim 2, wherein the bushing is provided at one end thereof with a first joint to be connected with the driving mechanism, and is provided at the other end thereof with a second joint to be connected with the cutter bit assembly.

4. The electrical tool according to claim 3, wherein the bushing comprises a first bushing and a second bushing sleeved outside the first bushing, and a wire for electrically connecting the driving mechanism with the cutter bit assembly is provided between the first bushing and a second bushing.

5. The electrical tool according to claim 4, wherein the wire and the first joint are electrically connected through a plug-in connection between a first wire pin and a first wire slot, while the wire and the second joint are electrically connected through a plug-in connection between a second wire pin and a second wire slot, the first joint being electrically connected to the driving mechanism, and the second joint being electrically connected to the cutter bit assembly.

6. The electrical tool according to claim 4, wherein the cutter bit assembly comprises a rotatable cutter and a speed adjustment switch for adjusting a rotational speed of the cutter; the speed adjustment switch is in a signal connection with the driving mechanism.

7. The electrical tool according to claim 6, wherein the driving mechanism comprises a driving motor for driving the cutter bit assembly to move; the driving motor is connected to the flexible transmission piece and the flexible transmission piece transmits the driving motion provided by the driving motor to the cutter bit assembly.

8. The electrical tool according to claim 7, wherein the driving mechanism further comprises torque detecting device for detecting torque of the driving motor, the torque detecting device being in a signal connection with the driving motor.

9. The electrical tool according to claim 7, wherein the driving mechanism comprises a control circuit being in a signal connection with the driving motor and the speed adjustment switch, respectively.

10. The electrical tool according to claim 7, wherein a power module is provided in the driving mechanism, and the power module comprises a storage battery and a power input interface to be connected with an external power source, the power input interface being electrically connected to the storage battery and the driving motor respectively.

11. The electrical tool according to claim 7, wherein the cutter bit assembly further comprises an adapter for mounting the cutter, on which is provided a first protrusion and a cutter bit slot, and a first groove with a shape matching the first protrusion is provided on the flexible transmission piece,
   wherein the adapter and the flexible transmission piece are in a matching connection through the first groove and the first protrusion, and the adapter and the cutter are in a matching connection through the cutter bit slot and an inserting end of the cutter.

12. The electrical tool according to claim 4, wherein the cutter bit assembly further comprises a rotatable cutter bit and a rotary switch for starting and interrupting a rotation of the cutter bit.

* * * * *